F. K. HURXTHAL.
ALINING BEARING FOR GEARING.
APPLICATION FILED MAR. 2, 1916.
1,215,810.
Patented Feb. 13, 1917.
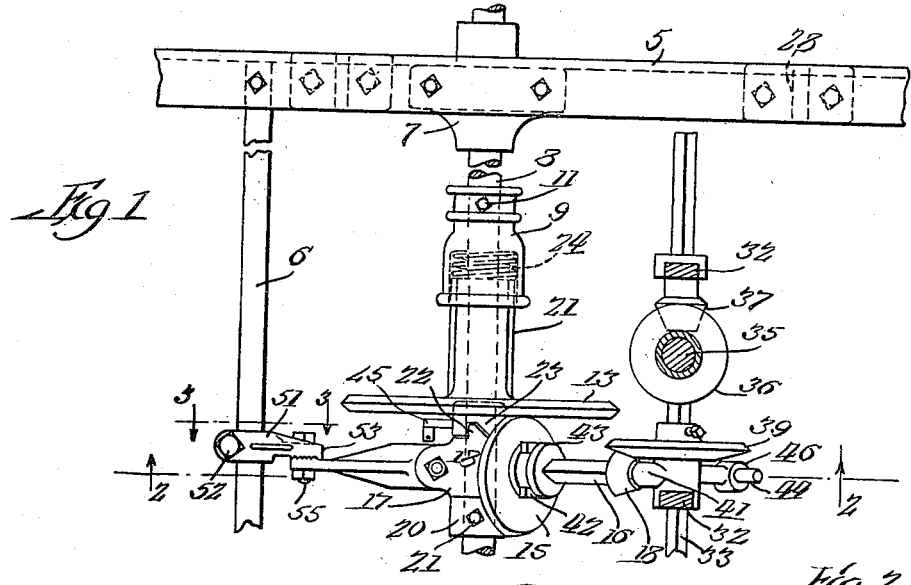
Fig 1.
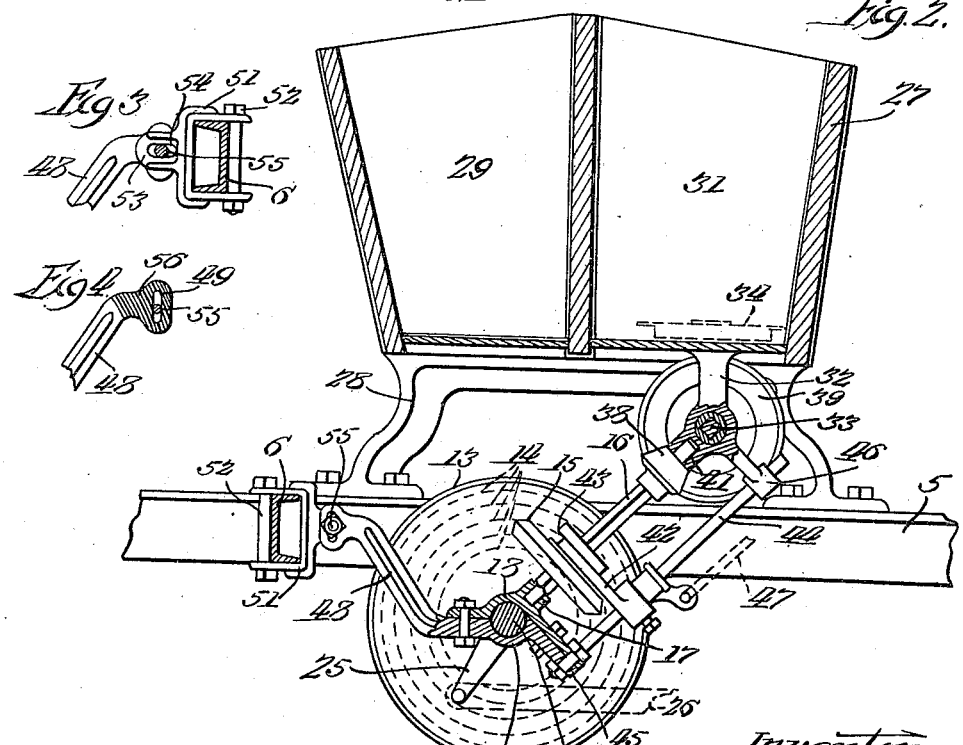
Fig 2.
Fig 3.
Fig 4.
Inventor:
Frederick K. Hurxthal
By Pond & Wilson
Attys.

UNITED STATES PATENT OFFICE.

FREDERICK K. HURXTHAL, OF ROCKFORD, ILLINOIS, ASSIGNOR TO EMERSON-BRANTINGHAM COMPANY, OF ROCKFORD, ILLINOIS, A CORPORATION OF ILLINOIS.

ALINING BEARING FOR GEARING.

1,215,810.        Specification of Letters Patent.        Patented Feb. 13, 1917.

Application filed March 2, 1916. Serial No. 81,675.

*To all whom it may concern:*

Be it known that I, FREDERICK K. HURXTHAL, a citizen of the United States, residing at Rockford, in the county of Winnebago and State of Illinois, have invented certain new and useful Improvements in Alining Bearings for Gearing, of which the following is a specification.

This invention relates in general to seeding machines but it should be understood that the term "seeding machine" is used in its broad sense to include not only machines for sowing small grain but also machines for sowing or distributing fertilizer, and also machines which are equipped to sow both seeds and fertilizer.

Machines of this general character comprise essentially a frame carried upon a supporting and driving shaft, a hopper mounted on the frame, seeding or distributing mechanism carried by the hopper, and driving connections between the supporting shaft and the seeding or distributing mechanism. The driving connections include an inclined shaft stepped in a bearing on the main driving and supporting shaft and connected at its other end with the shaft extending beneath the hopper to which the seeding and distributing devices are connected and from which they are operated.

The machines are shipped from the factory in knocked down condition to the dealers, who assemble them for the farmer. The main frames and drive shafts mounted thereon are shipped separately from the hoppers having the seeding or distributing mechanism mounted thereon, and the dealer mounts the hoppers on the frames and connects the main driving shafts with the seeding or distributing shafts carried by the hoppers, by mounting the inclined shafts heretofore mentioned in position to form a driving connection between the main shaft and the seeding shaft.

Because of slight inaccuracies either in the machine frames or the hoppers or the bearings, resulting principally from unequal shrinking of the cast parts, the bearings for the inclined shaft one of which is carried by the main drive shaft and the other by the hopper are frequently out of alinement so that the inclined shaft cannot be mounted in them. This fact made it necessary to assemble all of the seeding machines at the factory where first one and then another hopper is placed on a frame until one is found in which the inclined shaft bearings are properly alined. A number is then stenciled upon the frame and also upon the hopper indicating that this particular frame and hopper properly fit together. The machine is then dismantled again, crated and shipped to the dealer who receives instructions that in assembling the machines the number on the hopper must always correspond with the number of the frame.

It will be readily manifest that considerable time, expense and sometime annoyance are involved in fitting or matching the hoppers and frames at the factory then dismantling them and numbering them. Furtheremore, great care must be exercised that the hoppers and frames bearing corresponding numbers are shipped to the same dealer and then the dealer must sort out the frames and hoppers and assemble each hopper on its particular frame to which it has been previously fitted at the factory.

The primary object of my present invention is to provide an adjustable connection between the machine frame and the bearing in which the inclined shaft between the main shaft and the seeding mechanism shaft is mounted which will permit adjustment of this bearing so that it can readily be alined with the other bearing for the inclined shaft, thereby making it possible to fit any hopper on any frame, thus obviating the necessity of matching the frames and hoppers at the factory, numbering them, making sure that correspondingly numbered frames and hoppers are shipped to each dealer, and also obviating the necessity of rematching the frames and hoppers by the dealer, since by reason of my present invention frames and hoppers may be shipped indiscriminately from the factory and the dealers can take any frame and any hopper and fit them together without any difficulty.

In order to facilitate an understanding of my invention I have illustrated on the accompanying drawings such parts of a seeding machine as are necessary to a clear comprehension of the invention. Referring to the drawings—

Figure 1 is a fragmentary plan view of a seeding machine embodying my invention, the hopper being removed;

Fig. 2 is a transverse sectional view on the line 2—2 of Fig. 1, with a hopper mounted on the frame;

Fig. 3 is a detail view on the line 3—3 of Fig. 1; and

Fig. 4 is a face view of the end of a bearing arm.

On the drawings reference character 5 indicates generally the main frame of a seeding machine, which is ordinarily of angle iron construction, the side members being rigidly connected together by cross members 6, the front one only of which is shown. The side members of the frame are equipped with bearings 7 in which the main driving and supporting shaft 8 is mounted, this shaft being provided at each end with a large wheel which rests on the ground and by which the frame is carried and the shaft 8 is driven. A sleeve collar 9 is rigidly but adjustably secured to the shaft 8 by a set screw 11. It will be observed from Fig. 1 that the inner end of the sleeve collar is enlarged to receive the outer end of an elongated hub 12 splined to the shaft 8 and carrying a driving gear 13, the face of which is provided with a series of rows of teeth 14 (not shown) thereby forming a variable speed drive. A gear 15 slidably mounted on the inclined shaft 16 meshes with and is adapted to be driven by the gear 13, the speed of the gear 15 being determined by the longitudinal position of said gear on its shaft. The lower end of the shaft 16 is stepped in a bearing 17 mounted on and carried by the main shaft 8. It will be observed from Fig. 2 that the bearing 17 is formed in the upper member 18 of the bearing embracing the shaft 8, the lower member 19 of this bearing being bolted or otherwise rigidly secured to the upper member 18. A collar 20 is adjustably fixed by a set screw 21 to the shaft 8 to hold the bearing against movement in one direction longitudinally on the shaft 8. The side of the member 18 opposite the collar is provided with a pair of inclined lugs 22 and a rotatable collar 23 provided with recesses adapted to receive the lugs 22 is interposed on the shaft 8 between the bearing and the inner end of the hub 12. A coil spring 24 interposed between the outer end of the hub 12 and the bottom of the socket formed in the collar 9 normally urges the hub 12 toward the bearing to maintain the gear 13 in mesh with the gear 15. The collar 23 is provided with an arm 25 to the end of which is connected a link 26 by means of which a partial rotation may be imparted to said collar in a counter-clockwise direction so as to force the gear 14 away from the gear 15 by reason of the inclined coöperating faces of the lugs 22 and the recess in the collar. Suitable manually operated mechanism (not shown) is connected to the link 26 by means of which the link is operated to rotate the collar and thereby throw the gears 13 and 15 into and out of mesh at will.

The hopper, designated generally by reference character 27 is carried upon suitable standards 28 which in turn are bolted to the frame 5, as shown in Fig. 2. I have shown for purposes of illustration a hopper comprising two compartments 29 and 31 respectively, adapted to contain seed and fertilizer, but it should be understood that any preferred type of hopper, either single or double, may be employed without departing from the spirit of my invention. Upon the bottom of the hopper there are mounted a plurality of bearing brackets, two of which are shown, the same being designated by reference character 32, these brackets being adapted to support a square driving shaft 33 by means of which the feeding or distributing mechanisms, with which the hopper is equipped, are operated. I have shown in a general way, for purposes of illustration, one form of distributing mechanism which comprises a distributing wheel 34 located in the bottom of a hopper upon the upper end of a shaft 35, which is provided in turn at its lower end with a bevel gear 36 meshing with and driven by a companion bevel gear 37 mounted on the shaft 33. The shaft 33 is driven from the shaft 16 through a pair of bevel gears 38 and 39 mounted on the shafts 16 and 33 respectively. The bearing bracket 32 is provided with an inclined bearing 41 in which the upper end of the shaft 16 is stepped.

For the purpose of moving the gear 15 longitudinally of the shaft 16 and radially of the gear 13 to vary the speed at which the gear 15 and therefore the feeding or distributing mechanism will be driven from the constantly driven shaft 8, I have provided a bifurcated arm 42 embracing a grooved portion 43 of the hub of the gear 15, said arm being slidably mounted on a bar 44 fixed at its lower end in an extension 45 of the bearing on the shaft 8 and slidably engaged in a rearwardly extending bearing 46 on the bracket bearing 32. A link 47 controlled by a manually adjustable device (not shown) is employed to slide the arm 42 and thereby the gear 15 longitudinally of their respective bar 44 and shaft 16.

It will be observed that the lower member 19 of the bearing carried by the shaft 8 is provided with a forwardly and upwardly extending arm 48, and prior to my invention the outer end of this arm has customarily been rigidly attached to the cross member 6 of the machine frame. The driving mechanism carried by the shaft 8, including the bearing and the collars 9 and 19, are mounted on said shaft before the shaft is mounted in the frame, and it has been customary heretofore to rigidly bolt the arm 48 to the cross frame member 6 when these parts are assembled. The bearing bracket 32, the seeding and distributing mechanism carried thereby, are all mounted on the hopper at the factory while the shaft 16, its bevel gears and the controlling mechanism for the gear 15 are packed separately and not assembled until the complete machine is assembled by the dealer. Obviously the bearings 17 and 41 in which the opposite ends of the shaft 16 are stepped must aline, and since either or both of these bearings may be slightly distorted or displaced becaused of inequalities in the castings or inaccuracy in the construction of the frame or the hopper, it will be manifest that these bearings 17 and 41 are frequently out of alinement. It has therefore been necessary, as previously explained, to mount a hopper on the frame and insert the shaft 16 in the bearings to determine whether or not they are in alinement, and if it is found that they are not another hopper must be tried, and perhaps several, before one will be found in which the bearing 41 will accurately aline with the bearing 17. When the proper hopper is found both the hopper and the frame are marked and are then shipped to the dealer with instructions that this particular hopper and frame be assembled together.

Instead of fixedly attaching the end of the arm 48 to the frame of the machine my present invention contemplates an adjustable connection between this arm and the frame which will permit the arm and the bearing, of which it forms a part, to be swung upon the shaft 8 so that the bearing 17 can be adjusted into alinement with the bearing 41 of any hopper. With this end in view I have provided the end of the arm 48 with an elongated vertical slot 49 and have mounted upon the frame 46 a bracket or clevis 51 which may be rigidly secured by a bolt 52 and which is provided with a horizontally extending lug 53 provided with an elongated horizontal slot 54. A bolt 55 is inserted through the slots 49 and 54 to clamp the arm 49 to the lug 53. When the hopper is mounted on the frame by the dealer in assembling the machine, if it is found that the bearings 17 and 41 do not aline the bolt 55 is loosened and the arm 48 is swung upwardly or downwardly, as required, to bring the bearings into alinement. Considerable latitude of movement is permitted by reason of the elongated vertical and horizontal slots in the arm 48 and the lug 53, and when the bearings have been alined and the shaft 16 has been placed in position the bolt 55 is tightened up to rigidly clamp the arm 48 to the frame. For the purpose of insuring a rigid connection between the arm and the frame the opposed faces of the lug 53 and the arm 48 are corrugated as indicated at 56 and these corrugations are preferably struck on arcs concentric with the shaft 8 so that when the parts are firmly clamped together the corrugations will assist in maintaining them against displacement. Should it be found that the bearing 17 is out of alinement with respect to the bearing 41 laterally of the machine, this may be readily rectified by loosening the set screws 11 and 21 in the collars 9 and 19 respectively and adjusting the driving mechanism longitudinally of the shaft 8 the required distance.

It will be manifest that by providing this adjustable connection between the arm 48 and the machine frame I have made possible the requisite adjustment of the bearing 17 to bring it into alinement with the bearing 41, and since each machine is equipped with this adjustable feature it will be obvious that any hopper can be mounted on any frame and that the shaft 16 will always enter the bearings without binding. This adjustment therefore obviates the necessity of fitting and matching the hoppers and frames at the factory, eliminates the necessity of assembling and disassembling the hopper and frame at the factory and the necessity of marking the fitted hoppers and frames, also makes it possible to ship hoppers and frames indiscriminately to the dealers and enables the dealers to assemble the hoppers and frames without selecting any particular frames and hoppers from the shipment. The construction, operation and advantages of my invention should be apparent from the foregoing, as should the fact that my invention is not restricted to the particular details of construction illustrated and described herein but is confined only by the scope of the following claims.

I claim:

1. The combination of a frame, a driving shaft mounted thereon, a frame part separable from and adapted to be fixedly attached to the frame, driven means mounted on said frame part, bearings on the said driving shaft and said frame part adapted to be alined, a driven shaft mounted in said bearings for driving said driven means, and means for adjusting the bearing on the driving shaft relatively to the frame, whereby to aline the said bearings in case of discrepancy in alinement when said frame and frame part are secured together, and a driving connection between said driving and driven shafts.

2. The combination of two frame sections adapted to be rigidly secured together, one frame section carrying a driving shaft in fixed relation thereto and the other section carrying a driven mechanism and a bearing in fixed relation thereto, a bearing loosely mounted on the driving shaft, a shaft stepped in the latter bearing and being in driving connection with said driven mechanism, a driving connection between said shaft and driving shaft, and a connection between the driving shaft frame section and the bearing thereon for angularly adjusting the same to aline it with the bearing on the other frame section.

3. The combination of a frame, a driving shaft mounted thereon in fixed relation thereto, a frame part, a driven mechanism having a bearing associated therewith mounted on said frame part in fixed relation thereto, said frame part and driven mechanism as an entirety adapted to be fixedly attached to the frame, a bearing on the driving shaft, a shaft journaled in said bearing and being in driving connection with said driven mechanism, a driving connection between this shaft and the driving shaft, and means connecting said bearing on the driven shaft and the frame permitting adjustment of said bearing relatively to the bearing associated with the driven mechanism whereby to aline said bearings when discrepancy in alinement occurs through attachment of the frame part to the frame.

4. The combination of a machine frame, a driving shaft mounted thereon, a bearing mounted on said shaft so as to be capable of angular adjustment thereon, a frame part adapted to be fixedly mounted on the machine frame and carrying driving mechanism and a bearing, a driven shaft mounted in said bearing and adapted to be driven from said driving shaft and to drive said driven mechanism, an arm projecting from said bearing on the driving shaft, a bracket on said machine frame, said bracket and said arm being provided with slots disposed at an angle to each other respectively, and means passing through said slots for adjustably connecting said arm to said bracket.

FREDERICK K. HURXTHAL.

Copies of this patent may be obtained for five cents each, by addressing the "Commissioner of Patents, Washington, D. C."